US011062518B2

(12) United States Patent
Schmollgruber et al.

(10) Patent No.: US 11,062,518 B2
(45) Date of Patent: Jul. 13, 2021

(54) METHOD FOR DISPLAYING A MIXED REALITY IMAGE

(71) Applicant: StereoLabs, Orsay (FR)

(72) Inventors: Cécile Schmollgruber, Orsay (FR); Edwin Azzam, Orsay (FR); Olivier Braun, Orsay (FR); Pierre Yver, Orsay (FR)

(73) Assignee: STEREOLABS, Orsay (FR)

( * ) Notice: Subject to any disclaimer, the term of this patent is extended or adjusted under 35 U.S.C. 154(b) by 0 days.

(21) Appl. No.: 16/347,462

(22) PCT Filed: Oct. 31, 2017

(86) PCT No.: PCT/EP2017/077912
§ 371 (c)(1),
(2) Date: Jun. 2, 2019

(87) PCT Pub. No.: WO2018/083099
PCT Pub. Date: May 11, 2018

(65) Prior Publication Data
US 2020/0151957 A1    May 14, 2020

(30) Foreign Application Priority Data

Nov. 4, 2016 (FR) ..................................... 16 60714

(51) Int. Cl.
*G06T 19/00* (2011.01)
*H04N 13/156* (2018.01)
(Continued)

(52) U.S. Cl.
CPC ............ *G06T 19/006* (2013.01); *G06F 3/011* (2013.01); *H04N 13/156* (2018.05); *H04N 13/275* (2018.05)

(58) Field of Classification Search
CPC ... G06T 19/006; H04N 13/156; H04N 13/275
See application file for complete search history.

(56) References Cited

U.S. PATENT DOCUMENTS

| 2013/0083994 A1* | 4/2013 | Ren .......................... G06T 7/97 382/154 |
| 2013/0155058 A1* | 6/2013 | Golparvar-Fard ...... G06T 17/00 345/419 |

(Continued)

FOREIGN PATENT DOCUMENTS

| EP | 1732042 A1 | 12/2006 |
| EP | 2395767 A1 | 12/2011 |

OTHER PUBLICATIONS

PCT Report de Recherche Internationale for Patent Application No. PCT/EP2017/077912, dated Jan. 18, 2018, 3 pp.

*Primary Examiner* — Ming Wu
(74) *Attorney, Agent, or Firm* — Soquel Group LLC

(57) ABSTRACT

A method for displaying a mixed reality image, including provision of a display assembly including a camera and a display, acquisition of a first image by the camera according to actual image capturing characteristics, the first image being an image of a scene in the field of view of a user, extraction, from the first image, of actual illumination and position characteristics, selection of virtual elements to be integrated into the first image, modification of the virtual elements according to the actual image capturing, illumination and position characteristics, integration of the modified virtual elements in the first image to obtain a second image, and display of the second image on the display.

9 Claims, 2 Drawing Sheets

(51) Int. Cl.
*H04N 13/275* (2018.01)
*G06F 3/01* (2006.01)

(56) References Cited

U.S. PATENT DOCUMENTS

| | | | | |
|---|---|---|---|---|
| 2014/0210856 A1* | 7/2014 | Finn | ............... | G06K 9/00671 |
| | | | | 345/633 |
| 2014/0247280 A1* | 9/2014 | Nicholas | ............. | G06F 3/011 |
| | | | | 345/633 |
| 2016/0320620 A1* | 11/2016 | Maimone | ......... | G02B 27/0179 |

* cited by examiner

METHOD FOR DISPLAYING A MIXED REALITY IMAGE

CROSS-REFERENCE TO RELATED APPLICATIONS

This application claims benefit under 35 USC § 371 of PCT Application No. PCT/EP2017/077912 entitled METHOD FOR DISPLAYING A MIXED REALITY IMAGE, filed on Oct. 31, 2017 by inventors Cecile Schmollgruber, Edwin Azzam, Olivier Braun and Pierre Yver. PCT Application No. PCT/EP2017/077912 claims priority of French Patent Application No. 16 60714, filed on Nov. 4, 2016.

FIELD OF THE INVENTION

The present invention relates to a method for displaying a mixed reality image.

The present invention also relates to a computer program product associated with such a method.

The invention further relates to a display assembly comprising such a computer program product.

BACKGROUND OF THE INVENTION

In the context of the development of mixed reality, it is known to incorporate virtual elements, i.e., synthetic images, into images coming from the real world to obtain so-called mixed reality images. Mixed reality differs from virtual reality through the use of images of the real world. Mixed reality differs from augmented reality in that the virtual elements are not superimposed directly in the user's field of view, but are integrated into images of the user's field of view. Such images of the field of view come from an image capture system of the real world. The images of the field of view comprising the incorporated virtual images are next projected into the field of view of said user.

However, the elements incorporated into such mixed reality images stand out from elements initially present on the real image. The rendering of such incorporated elements is therefore not realistic.

There is therefore a need for a method improving the rendering of mixed reality images obtained by incorporating virtual elements into images of the real world.

SUMMARY OF THE DESCRIPTION

To that end, the invention relates to a method for displaying a mixed reality image, the mixed reality image being associated with a field of view of a user acquired by a camera and formed by a scene included in said field of view, the method comprising the steps of:
  providing a display assembly comprising a camera capable of acquiring images of the field of view of the user and a display for mixed reality images,
  acquiring a first image via the camera according to actual characteristics of shooting, the first image being an image of the scene in the field of view of the user, the scene comprising actual elements,
  extracting, from the first image, actual illumination and position characteristics of the actual elements,
  selecting virtual elements to be incorporated into the first image,
  modifying virtual elements as a function of actual shooting, illumination and position characteristics,
  incorporating modified virtual elements in the first image in order to obtain a second image, the second image being a mixed reality image, and
  displaying the second image on the display.

The invention relates to a physically based rendering (PBR) method using the parameters of an actual camera and actual lighting obtained by calibration or measurement in order to model a virtual camera identical to the actual camera and in particular having the same optical characteristics as the actual camera. The rendering obtained by the virtual camera is then merged coherently and photo-realistically in the image captured by the actual camera.

According to other advantageous aspects of the invention, the display method comprises one or more of the following features, considered alone or according to all technically possible combinations:
  each virtual element is associated with virtual image capture and illumination characteristics, the virtual elements incorporated in the second image having at least one virtual image acquisition characteristic identical to a corresponding actual image acquisition characteristic or at least one virtual illumination characteristic identical to a corresponding actual illumination characteristic;
  the modification step comprises modeling a virtual camera from image acquisition characteristics, the modification step comprising modifying virtual elements to be incorporated so that the modified virtual elements correspond to the images of the virtual elements that would have been obtained from the virtual camera;
  the camera comprises at least one sensor and at least one optic, the sensor having intrinsic characteristics and dynamic limitations, the optics having intrinsic characteristics and imperfections, the camera having settings and being able to be changed in position during image acquisition, the image acquisition characteristics being chosen from the list made up of: intrinsic characteristics of the sensor of the camera, dynamic limitations of the sensor of the camera, intrinsic characteristics of the optic of the camera, imperfections of the optic of the camera, settings of the camera and any changes in position of the camera during image acquisition;
  the actual elements comprise at least one light source, the illumination characteristics being relative to at least one of the position or the intensity of said light source;
  the modification step comprises modifying the appearance of the virtual elements by applying illumination effects on the virtual elements as a function of the illumination and position characteristics;
  the camera is a stereoscopic camera, the first image being a stereoscopic image, the first image being formed by a first left image and a first right image, the incorporating step comprising incorporating modified elements into one of the first left image or the first right image taken as reference image in order to obtain a second left image, respectively a second right image, the incorporating step also comprising applying a transform to the second left image, respectively the second right image, obtained in order to obtain a second right image, respectively a second left image, the second image being a stereoscopic image formed from the second left image and the second right image;
  the selection step is carried out by the user.

The invention also relates to a computer program product including a readable information medium, on which a computer program is stored comprising program instructions, the computer program being able to be loaded on a data processing unit and suitable for driving the implementation of a display method as previously described when the computer program is implemented on the data processing unit.

The invention also relates to an assembly for displaying a mixed reality image, the mixed reality image being associated with a field of view of a user and formed by a scene included in said field of view, the assembly comprising:
- a camera capable of acquiring images of the field of view of the user,
- a display for mixed reality images,
- a logic controller comprising a processor comprising a data processing unit, and
- a computer program product as previously described.

BRIEF DESCRIPTION OF THE DRAWINGS

Other features and advantages of the invention will appear upon reading the following description of embodiments of the invention, provided solely as an example and done in reference to the drawings, which are.

DETAILED DESCRIPTION

Figure 1:
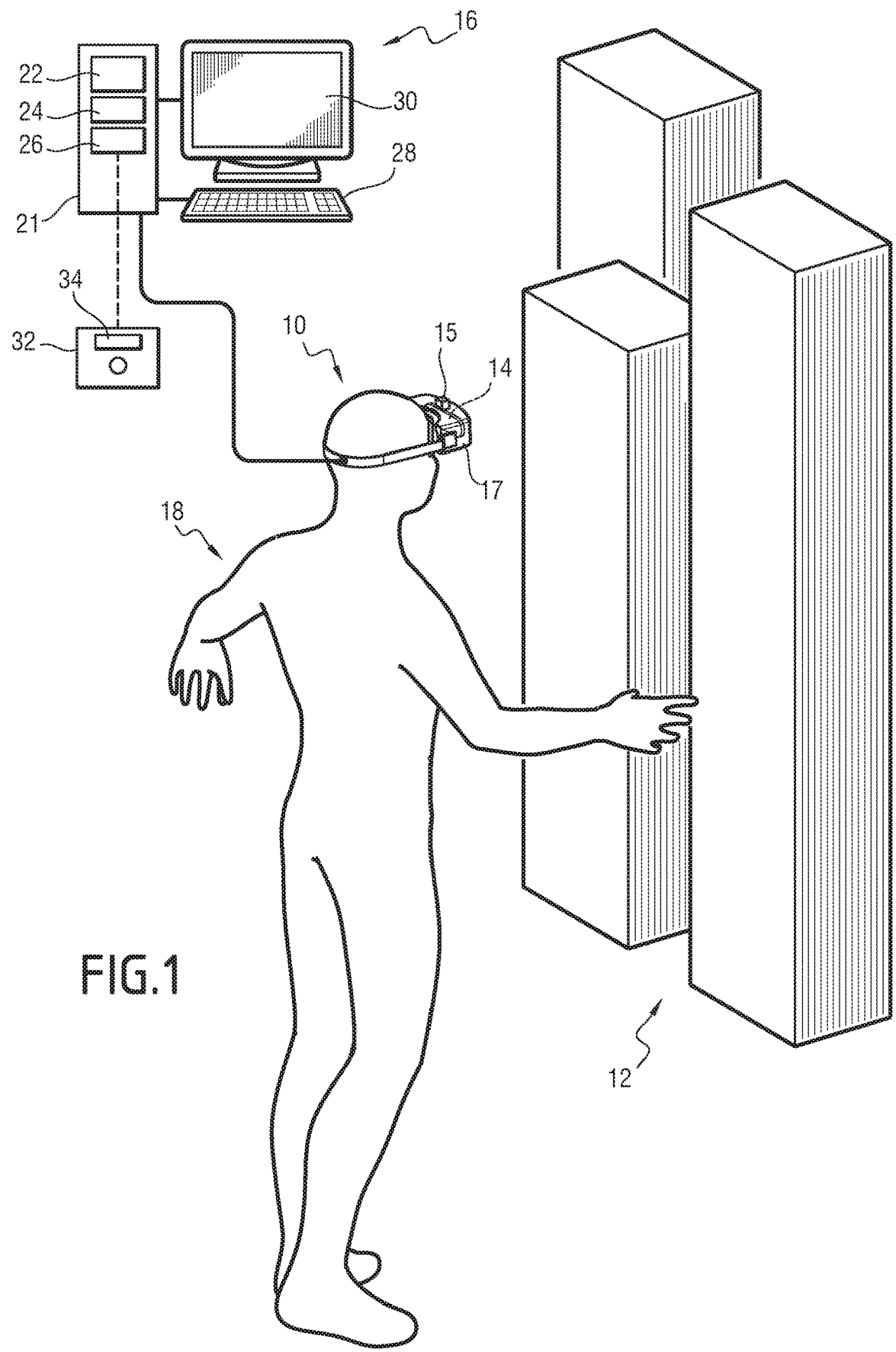
FIG. 1 is a schematic view of a display assembly and a scene, in accordance with an embodiment of the present invention.

A display assembly 10 and a scene 12 are illustrated in FIG. 1.

The scene 12 is a scene from the actual world, both an indoor scene and an outdoor scene.

The assembly 10 comprises a display 14 for mixed reality images, a camera 15 and a logic controller 16.

The display 14 and the camera 15 interact with the logic controller 16. Such an interaction is for example done by a wired connection or a wireless connection, such as a Wi-Fi or Bluetooth connection.

In the example illustrated in FIG. 1, the display 14 and the camera 15 are on board a mixed reality helmet 17.

The helmet 17 can be positioned on the head of a user 18.

The helmet 17 is configured to immerse the user 18 in a mixed reality.

The camera 15 is suitable for acquiring color images. The range of wavelengths detected by the camera 15 for example corresponds to the visible domain. The visible domain is defined as the range of wavelengths comprised broadly speaking between 380 nanometers (nm) and 780 nm.

The camera 15 comprises one or several sensors. Such sensors are photosensitive components making it possible to convert an electromagnetic radiation into an analogue electrical signal. The components are for example CCD (Charge-Coupled Device) components.

The camera 15 also comprises one or several optics. The optics are for example lenses or mirrors.

The camera 15 is preferably a stereoscopic camera. A stereoscopic camera is a camera comprising two optical sensors each capable of acquiring the image of a same scene from two slightly distant points of view. The images acquired by said sensors are next presented to the user such that the left image is seen only by the left eye of the user and the right image is seen only by the right eye of the user, which gives a relief effect.

In one preferred embodiment, the camera 15 has the characteristics of the image capture system described in patent application WO 2016/097609 A.

The camera 15 is arranged on the helmet 17 so as to acquire images of the field of view of the user 18. The field of view is defined as the portion of the space seen by an eye looking straight in front of him and immobile.

The camera 15 is capable of communicating the acquired images to the logic controller 16.

The camera 15 has actual image capture characteristics.

The actual image capture characteristics are for example chosen from the list made up of: intrinsic characteristics of the sensor(s) of the camera 15, dynamic limitations of the sensor(s) of the camera 15, intrinsic characteristics of the optic(s) of the camera 15, imperfections of the optic(s) of the camera 15, settings (gain, exposure time, white balance) of the camera 15 and any changes in position of the camera during the image capture.

The intrinsic characteristics of the sensor(s) of the camera 15 are for example relative to the resolution of the camera 15, the noise of the camera 15 and/or the modulation transfer function of the camera 15.

The resolution of the camera 15 is the number of pixels of each sensor of the camera 15 per unit of length. The resolution of the camera 15 is for example obtained directly from a manual provided by the manufacturer of the camera 15.

The noise of the camera 15 is a random noise causing a very slight variation in the intensity of the pixels of the camera 15 when the camera 15 acquires a fixed scene.

The noise of the camera 15 is for example quantified by a calibration. Such a calibration for example consists of acquiring, at constant illumination, a set of images with the camera 15 and a fixed scene. The fixed scene is preferably a color checker, such as a Macbeth color checker to observe a broad enough range of colors. The variation in the intensity of the pixels is next modeled in the form of a Gaussian distribution.

The modulation transfer function (abbreviated MTF) of an optical system is a function making it possible to evaluate the contrast of the image obtained by the optical system as a function of the spatial frequency.

The modulation transfer function of the camera 15 is for example obtained by calibration from optical checkers at different spatial frequencies.

The dynamic limitations of the sensor of the camera 15 are for example relative to the alteration of the colors between a scene in the field of view of the camera 15 and the image of the scene acquired by the camera 15, as a function of the illumination and the contrast of the scene.

Such an alteration of the colors is modeled from a function, called response function of the camera 15. The response function of the camera 15 makes the connection between the luminance of the scene acquired by the camera 15 and the intensity of the pixels of the image acquired by the camera 15. Such a function is for example approximated by a radiometric calibration. The Mitsunaga document titled "*Radiometric self-calibration*", published in Computer Vision and Pattern Recognition, 1999, IEEE Computer Society Conference on. (Vol. 1) describes a method for obtaining such a function.

The intrinsic characteristics of the optic(s) of the camera 15 are for example relative to the opening and the image focal distance of the camera 15.

The opening of an optical system is a dimensionless number defined as the ratio of the image focal distance of the optical system by the diameter of the entry pupil of said optical system.

The opening of the camera 15 and the image focal distance of the camera 15 are, for example, obtained directly by the manual provided by the manufacturer of the camera 15.

The opening and the image focal distance of the camera 15 in relation to the characteristics of the images acquired by the camera 15 make it possible to estimate the depth of field, and thus the gradual soft-focus effect created by the camera 15. The depth of field of the camera 15 corresponds to the zone of the space acquired sharply by the camera 15. The gradual soft focus is the soft focus due to the depth of field of the camera 15.

The imperfections of the optic(s) of the camera 15 are, for example, relative to the geometric abnormalities caused by the optics of the camera 15. Such geometric abnormalities are, for example, spherical abnormalities, coma, astigmatism, curvature of field or distortion.

The geometric abnormalities are for example quantified by a calibration of the camera 15.

The distortion is for example calibrated from a rectangular checker of the checkerboard type. The detection of the corners of each checkerboard makes it possible to define a distortion function.

The other aberrations, such as chromatic aberrations, are for instance estimated similarly by separating the different color channels: red, green and blue of an image.

The settings of the camera 15 are, for example, relative to the saturation of the camera 15, the white balance of the camera 15 and/or the exposure time of the camera 15.

The saturation is a coordinate of the color system TSL (acronym for Tint, Saturation, Luminosity). The saturation provides a measurement of the intensity of the color identified by its shade. The luminosity corresponds to a measure of the quantity of light.

The saturation of the camera 15 is, for example, determined manually by the user.

The white balance is a setting to be done on a camera making it possible to offset the temperature of colors, such that the white zones of a scene in the field of view of the camera appear white in the image of the scene acquired by the camera.

The white balance of the camera 15 is determined by a measurement or directly by the manual provided by the manufacturer of the camera 15.

The exposure time or placement time of the camera 15 is the time interval during which the shutter of the camera 15 allows light to pass during an image capture, and therefore the exposure duration of the sensors of the camera 15 to the light.

The exposure time of the camera 15 in relation to the characteristics of the images acquired by the camera 15 makes it possible to estimate the blurring by motion of the camera 15. The blurring by motion of the camera 15 is the blurring produced by the movement of the camera 15 during the image capture.

Any changes in position of the camera 15 during image capture are, for example, relative to a rolling shutter effect.

The rolling shutter effect is a photographic mechanism that consists of recording an image by rolling, i.e., the images are acquired line by line by scanning. Such a mechanism creates artifacts when the image acquired by the camera comprises objects moving quickly or that are subject to light fluctuating quickly. Such artifacts are the deformation of the objects in question.

Such artifacts are, for example, modeled by estimating the movement speed of the camera. Such an estimate is for example described in document WO 2015/071458. The movement speed is, for example, obtained by using a camera according to the image capture system described in patent application WO 2016/097609 A. The position of the camera in space for each image acquired by the camera is provided by the camera. The speed between each image is then deduced from positions assumed by the camera between two successive images.

The logic controller 16 is capable of collecting the images from the camera 15 and processing said images to obtain modified images. The logic controller 16 is capable of sending the modified images to the display 14 in order to display said images.

The logic controller 16 is for example a computer.

The logic controller 16 comprises a processor 21 comprising a data processing unit 22, memories 24 and an information medium reader 26. The logic controller 16 optionally comprises an input device 28 such as a keyboard or a lever and a display unit 30. The logic controller 16 further includes connections to a network such as the local network allowing several users to connect in a network.

The logic controller 16 interacts with a computer program product 32.

The computer program product 32 includes an information medium 34.

The information medium 34 is a medium readable by the logic controller 16, usually by the data processing unit 22.

The readable information medium 34 is a medium suitable for storing electronic instructions and able to be coupled with a bus of a computer system.

As an example, the readable information medium is a floppy disk, an optical disc, a CD-ROM, a magnetic-optical disc, a ROM memory, a RAM memory, an EPROM memory, an EEPROM memory, a magnetic card or an optical card.

The computer program comprising program instructions is stored on the information medium.

The computer program can be loaded on the data processing unit 22 and is suitable for driving the implementation of a display management method that will be described in more detail in the remainder of the description.

In the embodiment illustrated in FIG. 1, the logic controller 16 is separate from the helmet 17.

Figure 2:
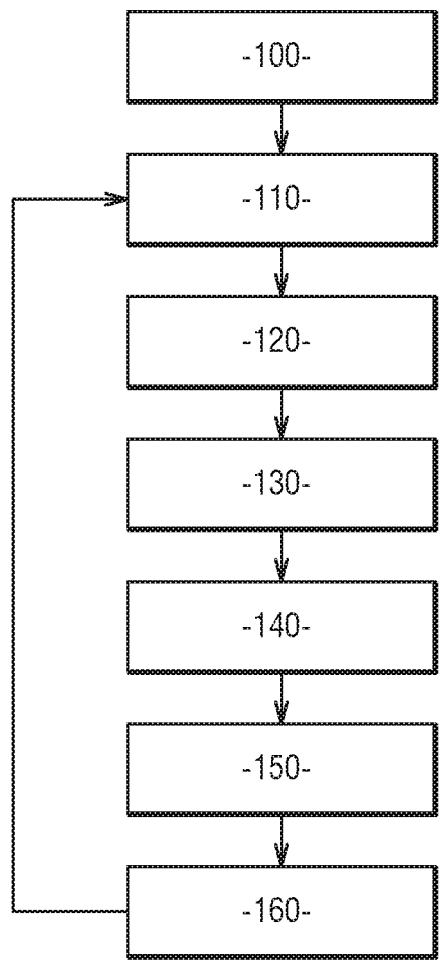
FIG. 2 is a flowchart of an example of a display method, in accordance with an embodiment of the invention.

As a variant, the logic controller 16 is on board the helmet 17. A method for displaying a mixed reality image using the display assembly 10 will now be described in reference to FIG. 2.

The display method comprises a step 100 for providing the display assembly 10 previously described.

The display method also comprises a step 110 for acquiring a first image via the camera 15 according to the actual image capture characteristics of the camera 15.

The first image is an image of a scene included in the field of view of the user 18. The scene comprises actual elements. The actual elements comprise at least one light source.

When the camera 15 is a stereoscopic camera, the first image is a stereoscopic image. The first image is then formed by a first left image and a first right image.

The display method comprises a step 120 for extracting, from the first image, actual illumination and position characteristics of the actual elements. The extraction step is carried out by the logic controller 16 interacting with the computer program product 32.

The illumination characteristics relate to at least one of the position, the intensity or the propagation direction of the light sources of the scene of the first image.

The position and the intensity of the light sources of the scene are for example obtained using a method as described in the article by Meilland et al. titled "3D High Dynamic Range Dense Visual SLAM and its application to Real-Time Object Re-lighting," published in Mixed and Augmented Reality (ISMAR), 2013 IEEE International Symposium on IEEE, 2013.

In addition, the position and the intensity of the light sources of the scene are identified from images of the scene acquired at very short and precisely known exposure times. More specifically, by decreasing the exposure of the camera 15, only the strong points of the light sources are kept and the ambient light due to the reflections of the light rays on more or less reflective surfaces of the actual scene is eliminated. The images are next put in binary form, which makes it possible to isolate the light sources. The position of the light sources relative to the camera 15 is determined by the depth map providing the position in three dimensions of each pixel. The spatial position relative to a common global coordinate system (initial camera position) is next determined by calculating the current camera position.

As a variant, for a scene in which the illumination is constant, the positions of the light sources of the scene are identified by mapping the light sources dynamically or a priori. Such a variant involves finding a relative original coordinate system, when the camera does not have an absolute positioning system of the GPS type (Global Positioning System).

The position characteristics are relative to the position of the actual elements in the scene of the first image.

For example, the extraction step 120 makes it possible to obtain a depth map. A depth map is a map depicting the scene acquired by the camera with gray levels or colors, each gray level or color corresponding to a distance between an element of the scene and the camera 15. The depth map is for example obtained directly via the camera 15 during the acquisition of the first image.

Preferably, the depth map and the positions of the light sources are recorded in a database in order to make it possible to find a position in the space previously viewed by the camera by pointing the camera toward the same scene.

The display method also comprises a step 130 for selecting virtual images to be incorporated into the first image.

Each virtual element is associated with virtual image capture and illumination characteristics.

The elements to be incorporated are for example virtual characters or static or moving virtual objects.

The selection step is carried out by the user 18. For example, the user 18 chooses the virtual elements to be incorporated from among a list of virtual elements as a function of the use that said user 18 makes of the mixed reality helmet 17. For example, in the case of a video game, the user 18 launches the application corresponding to the video game and the virtual elements corresponding to the video game are automatically selected by the logic controller 16.

In a variant, the selection step is carried out only by the logic controller 16.

The display method comprises a step 140 for modifying virtual elements as a function of actual image capturing, illumination and position characteristics. The modification step 140 is carried out by the logic controller 16 interacting with the computer program product 32.

The modification step 140 comprises modeling a virtual camera from image acquisition characteristics and modifying virtual elements to be incorporated so that the modified virtual elements correspond to the images of the virtual elements that would have been obtained from the virtual camera. In practice, this amounts to directly processing the virtual elements to be incorporated with the artifacts introduced by the virtual camera.

The virtual camera has one or several virtual sensors and one or several virtual optics. The virtual camera also has virtual image capture characteristics identical to the actual image capture characteristics of the camera 15.

More specifically, when the actual image capture characteristics are intrinsic characteristics of the sensor(s) of the camera 15, the virtual sensor(s) of the virtual camera have the same intrinsic characteristics.

For example, the virtual camera is a camera having the same resolution as the camera 15. Thus, the resolution of the modified virtual elements is limited to the resolution of the camera 15.

For example, the images generated by the virtual camera include the same noise as the camera 15. The modified virtual images then have such noise.

For example, the virtual camera has the same modulation transfer function as the camera 15.

In practice, this amounts to modifying the rendering of the virtual elements to be incorporated so as to reproduce the effects created by the limitations of the camera 15 to capture the contrast as a function of the fineness of the details. Such processing is for example obtained by reducing the size of the images of the virtual elements, then applying filters, such as Gaussian filters, to said obtained images. Next, the images of the elements are enlarged again to their original sizes and filters, in particular a Bayer filter, are applied to said images.

In addition, an additional blur is applied to the edges of the virtual elements to be incorporated. To that end, a Gaussian filter is applied on the mask of the geometry of the virtual elements, to obtain a degradation (the values of the mask being converted from binary to floaters between 0 and 1). The mask of the geometry of the virtual elements is a binary image for which the intensities are equal to 0 for the pixels representing an actual element and equal to 1 for the pixels representing a virtual element. In postprocessing, the contours of the virtual elements are merged with the actual image progressively using a mask with a threshold. The threshold of the mask makes it possible to adjust the propagation of the blur around the virtual elements to avoid a halo effect.

The application of such an additional blur makes it possible to re-transcribe, on the virtual elements to be incorporated, the fact that the camera 15 attenuates the high frequencies and therefore that the acquired actual image has contours that are less sharp than the image of the virtual elements. When such a blur is not applied on the virtual elements to be incorporated, the virtual elements to be incorporated, which by default are perfectly sharp, stand out significantly from the actual image.

When the actual image capture characteristics are the dynamic limitations of the sensor(s) of the camera 15, the virtual sensor(s) of the virtual camera have the same dynamic limitations.

For example, the response function is applied to the virtual elements to be incorporated so as to reproduce, on the virtual elements to be incorporated, the alteration of the colors of the first image.

When the actual image capture characteristics are the intrinsic characteristics of the optic(s) of the camera 15, the virtual optic(s) of the virtual camera have the same intrinsic characteristics.

For example, the opening of the virtual camera and the image focal distance of the virtual camera are identical to the opening of the camera 15 and the image focal distance of the camera 15.

Furthermore, the opening of the camera 15, the image focal distance of the camera 15 and the depth map of the scene of the first image make it possible to determine a progressive soft-focus effect due to the depth of field of the camera 15. The depth of field refers to half of the hyperfocal distance to infinity. The hyperfocal distance is the minimum distance from which it is possible to perform focusing while keeping the objects situated at infinity with an acceptable sharpness. Focusing at this distance makes it possible to obtain the widest acceptable sharpness range, which then extends from half this distance to infinity. The gradual soft-focus effect manifests itself in the zone beyond the sharpness zone defined by the hyperfocal distance.

The virtual camera is then configured to reproduce such a gradual soft-focus effect. Thus, such a gradual soft-focus effect is present on all of the modified virtual elements.

When the actual image capture characteristics are the imperfections of the optic(s) of the camera 15, the optical sensor(s) of the virtual camera have the same imperfections.

For example, the virtual camera reproduces the geometric abnormalities of the camera 15. Thus, such geometric abnormalities are present on the modified virtual elements.

In a variant, the geometric abnormalities are directly eliminated from the first image and are therefore not modeled on the virtual camera.

When the actual image capture characteristics are the settings of the camera 15, the virtual camera has the same settings as the camera 15.

For example, the virtual camera has the same saturation as the camera 15. Thus, the saturation of the colors of the modified virtual elements is compliant with the saturation of the colors of the camera 15.

For example, the virtual camera has the same white balance as the camera 15. Thus, the rendering of the modified virtual elements complies with the white balance of the camera 15.

For example, the virtual camera has the same exposure time as the camera 15.

Furthermore, the exposure time of the camera 15 and the position of the camera 15 make it possible to deduce the acceleration of the camera 15 and thus to determine the blurring by motion effect of the camera 15. The virtual camera is then configured to reproduce such a blurring by motion effect. Thus, such a blurring by motion effect is present on all of the modified virtual elements.

When the actual image capture characteristics are the position changes of the camera 15 during image capture, the virtual camera has the same changes in position as the camera 15.

Furthermore, the virtual camera reproduces the artifacts due to the rolling shutter effect of the camera 15. Thus, such artifacts are present on the modified virtual elements.

In a variant, such artifacts are directly eliminated from the first image and are therefore not modeled on the virtual camera.

The modification step 140 further comprises modifying the appearance of the virtual elements to be incorporated as a function of the actual illumination and position characteristics.

For example, such an appearance modification consists of applying illumination effects on the modified virtual elements. The illumination effects are for example projecting shadows from the elements to be incorporated toward elements of the first image or vice versa, or modifying the illumination of the textures of the virtual elements (modifying the light intensity as well as the shade of said virtual elements).

Taking actual illumination and position characteristics into account makes it possible to make the modifications of the appearance of the virtual elements to be incorporated coherent with the first image.

The display method comprises a step 150 for incorporating modified virtual elements in the first image in order to obtain a second image. The second image is a mixed reality image.

The integration step 150 is carried out by the logic controller 16 interacting with the computer program product 32.

When the first image is a stereoscopic image, the second image is also a stereoscopic image. The second image is then formed by a second left image and a second right image.

The incorporating step 150 then comprises incorporating modified elements on one of the first left image or the first right image taken as reference image in order to obtain the second left image, respectively the second right image. For example, the virtual camera providing the rendering of the left image undergoes a transform in order to obtain the position of the right virtual camera. The transfer makes it possible to offset the virtual images of the second image used as reference by a slightly different distance to obtain a parallax effect. Such a transform is done by modifying the position of the right virtual camera by a distance equal to the separation between the two sensors of the actual stereoscopic camera.

The virtual image capture characteristics of the virtual elements are preferably identical to the corresponding actual image capture characteristics. Likewise, the virtual illumination characteristics are preferably identical to the corresponding actual illumination characteristics.

The display method comprises a step 160 for displaying the second image in the field of view of the user. Typically, the second image is displayed on the display 14.

When the second image is a stereoscopic image, the second left image is displayed on the display 14 in front of the left eye of the user and the second right image is displayed on the display 14 in front of the right eye of the user.

In a variant, one skilled in the art will understand that the second image is displayed on any other display, such as a screen, in the field of view of the user.

The acquisition 110, extraction 120, selection 130, modification 140, incorporation 150, display 160 steps are reiterated over time.

Thus, the method uses the actual characteristics of the camera 15 and illumination characteristics obtained by calibration or measurement in order to model an identical virtual camera having the same image capture characteristics as the camera 15. The rendering obtained by such a virtual camera is then merged coherently and photo-realistically in the image captured by the actual camera.

Furthermore, the second images are retrieved for the user in real time, which increases the sensation of realism.

Such a display method therefore improves the rendering of mixed reality images obtained by incorporating virtual elements into images of the real world.

The invention claimed is:

1. A method for displaying a mixed reality image, comprising:

providing a display assembly comprising a camera acquiring images of a scene in a field of view of a user, and a display for displaying mixed reality images, wherein a mixed reality image is a real-world image with embedded virtual elements, the virtual elements comprising synthetic characters or objects;

acquiring a first image of the scene in the field of view of the user via the camera according to actual characteristics of illumination and position, the scene comprising real elements;

extracting, from the first image, the actual characteristics of illumination and position of the real elements by dynamically identifying positions and intensities of light sources in the scene;

selecting virtual elements to be incorporated into the first image;

modifying the appearance of the virtual elements by projecting shadows on the virtual elements based on the actual characteristics of illumination and position;

embedding the modified virtual elements in the first image in order to obtain a second image, the second image being a mixed reality image; and displaying the second image on the display.

2. The method according to claim 1, wherein each virtual element is associated with virtual characteristics of shooting and of illumination, the virtual elements incorporated in the second image having at least one virtual characteristic of shooting identical to a corresponding actual characteristic of shooting or at least one virtual characteristic of illumination identical to a corresponding actual characteristic of illumination.

3. The method according to claim 1, wherein said modifying comprises:

modeling a virtual camera from the characteristics of shooting; and modifying virtual elements to be incorporated so that the modified virtual elements correspond to the images of the virtual elements that would have been obtained from the virtual camera.

4. The method according to claim 1, wherein the camera comprises at least one sensor and at least one optics element, the sensor having intrinsic characteristics and dynamic limitations, the optics having intrinsic characteristics and imperfections, the camera having settings and being able to be changed in position during image acquisition, the characteristics of shooting being chosen from the list consisting of: intrinsic characteristics of the sensor of the camera, dynamic limitations of the sensor of the camera, intrinsic characteristics of the optics of the camera, imperfections of the optics of the camera, settings of the camera and any changes in position of the camera during image acquisition.

5. The method according to claim 1, wherein the real elements comprise at least one light source, the characteristics of illumination being relative to at least one of the position or the intensity of the light source.

6. The method according to claim 1, wherein the camera is a stereoscopic camera, wherein the first image is a stereoscopic image formed by a left and right image, wherein said incorporating comprises:

incorporating the modified elements into either the left or right image, taken as reference image, in order to obtain a respective second left image or second right image; and applying a transform to the obtained second left image or second right image, to further obtain a respective second right or second left image, and wherein the second image is a stereoscopic image formed from the second left and second right images.

7. The method according to claim 1, wherein said selecting is carried out by the user.

8. A non-transitory computer readable medium storing instructions, which, when executed by a processor of an electronic device, cause the processor to:

extract, from a first image of a scene in the field of view of a user, actual characteristics of illumination and position of real elements in the scene, by dynamically identifying positions and intensities of light sources in the scene;

receive a selection of virtual elements to be incorporated into the first image, the virtual elements comprising synthetic characters or objects;

modify the appearance of the virtual elements by projecting shadows on the virtual elements based on the actual characteristics of illumination and position;

embed the modified virtual elements in the first image in order to obtain a second image, the second image being a mixed reality image, wherein a mixed reality image is a real-world image with embedded virtual elements; and display the second image.

9. An assembly comprising:

a camera acquiring a first image of a scene in a field of view of a user according to actual characteristics of illumination and position, the scene comprising real elements;

a display displaying mixed reality images, wherein a mixed reality image is a real-world image with embedded virtual elements, the virtual elements comprising synthetic characters or objects; and a logic controller comprising a data processor configured to:

extract, from the first image, the actual characteristics of illumination and position of the real elements by dynamically identifying positions and intensities of light sources in the scene;

receive a selection of virtual elements to be incorporated into the first image;

modify the appearance of the virtual elements by projecting shadows on the virtual elements based on the actual characteristics of illumination and position;

embed the modified virtual elements in the first image in order to obtain a second image, the second image being a mixed reality image; and display the second image on said display.

* * * * *